United States Patent [19]
Li et al.

[11] Patent Number: 5,835,793
[45] Date of Patent: Nov. 10, 1998

[54] DEVICE AND METHOD FOR EXTRACTING A BIT FIELD FROM A STREAM OF DATA

[75] Inventors: Stephen Hsiao Yi Li, Garland; Frank L. Laczko, Sr., Allen; Jonathan Rowlands, Dallas, all of Tex.

[73] Assignee: Texas Instruments Incorporated, Dallas, Tex.

[21] Appl. No.: 851,168

[22] Filed: May 2, 1997

[51] Int. Cl.[6] ............................... G06F 9/30; G06F 12/06
[52] U.S. Cl. ............................ 395/898; 345/516
[58] Field of Search ...................... 395/562, 564, 395/565, 566, 898; 704/503; 345/191, 202, 516; 382/246; 341/67; 711/2

[56] References Cited

U.S. PATENT DOCUMENTS

| 5,032,838 | 7/1991 | Murayama et al. | 341/67 |
| 5,218,674 | 6/1993 | Penslee et al. | 345/525 |
| 5,309,156 | 5/1994 | Fujiyama et al. | 341/67 |
| 5,315,696 | 5/1994 | Case et al. | 345/515 |
| 5,623,556 | 4/1997 | Murayama et al. | 382/233 |

OTHER PUBLICATIONS

MPEG–1, 3–11172, Jul. 14, 1992.
MPEG–2, *Information Technology—Generic Coding of Moving Pictures and Audio:Audio ISO/IEC 13818–3*, 2$^{nd}$Edition, 20 Feb. 1997 (ISO/IEC JTC1/SC29/WG11 N1519), Int'l Org. for Standardisation Coding of Moving Pictures and Audio.

*Digital Audio Compression Standard (AC–3)* 20 Dec., 1995, Advanced Television Systems Committee, ATSC Standard.

T1–17424A (S.N. 08/475,251), filed Jun. 7, 1995, *Integrated Audio Decoder System and Method of Operation*.

T1–17600 (S.N. 08/054,127), filed Sep. 26, 1993, *System Decoder Circuit With Temporary Bit Storage and Method of Operation*.

T1–24442P (S.N. 60/030,106), filed Provisionally Nov. 1, 1996, *Integrated Audio/Video Decoder Circuitry*.

*Primary Examiner*—Parshotam S. Lall
*Assistant Examiner*—Viet Vu
*Attorney, Agent, or Firm*—Gerald E. Laws; James C. Kesterson; Richard L. Donaldson

[57] ABSTRACT

A data processing device uses a portion of a random access memory as an input buffer 114 for holding a portion of a stream of data which is being processed by a processing unit within the processing device. A Get Bit-Field instruction is provided which directs the processing unit to extract selected bit fields from the data stream stored in the input buffer. A register R6 holds a bit address which points to the end of a selected bit field, while a register R0 holds the width of the selected bit field. An address register is connected to a register R6 in a manner that allows data words to be accessed in input buffer 114 using only a word portion of the bit address. A funnel shifter 203 is disposed to extract the selected bit field from concatenated data words in response to a bit address portion of the bit address in register R6.

16 Claims, 7 Drawing Sheets

DEVICE AND METHOD FOR EXTRACTING A BIT FIELD FROM A STREAM OF DATA

FIELD OF THE INVENTION

This invention relates in general to the field of electronic systems and more particularly to an improved modular audio data processing architecture and method of operation.

BACKGROUND OF THE INVENTION

Audio and video data compression for digital transmission of information will soon be used in large scale transmission systems for television and radio broadcasts as well as for encoding and playback of audio and video from such media as digital compact cassette and minidisc.

The Motion Pictures Expert Group (MPEG) has promulgated the MPEG audio and video standards for compression and decompression algorithms to be used in the digital transmission and receipt of audio and video broadcasts in ISO-11172 (hereinafter the "MPEG Standard"). The MPEG Standard provides for the efficient compression of data according to an established psychoacoustic model to enable real time transmission, decompression and broadcast of CD-quality sound and video images. The MPEG standard has gained wide acceptance in satellite broadcasting, CD-ROM publishing, and DAB. The MPEG Standard is useful in a variety of products including digital compact cassette decoders and encoders, and minidisc decoders and encoders, for example. In addition, other audio standards, such as the Dolby AC-3 standard, involve the encoding and decoding of audio and video data transmitted in digital format.

The AC-3 standard has been adopted for use on laser disc, digital video disk (DVD), the US ATV system, and some emerging digital cable systems. The two standards potentially have a large overlap of application areas.

Both of the standards are capable of carrying up to five full channels plus one bass channel, referred to as "5.1 channels," of audio data and incorporate a number of variants including sampling frequencies, bit rates, speaker configurations, and a variety of control features. However, the standards differ in their bit allocation algorithms, transform length, control feature sets, and syntax formats.

Both of the compression standards are based on psychoacoustics of the human perception system. The input digital audio signals are split into frequency subbands using an analysis filter bank. The subband filter outputs are then downsampled and quantized using dynamic bit allocation in such a way that the quantization noise is masked by the sound and remains imperceptible. These quantized and coded samples are then packed into audio frames that conform to the respective standard's formatting requirements. For a 5.1 channel system, high quality audio can be obtained for compression ratio in the range of 10:1.

The transmission of compressed digital data uses a data stream that may be received and processed at rates up to 15 megabits per second or higher. Prior systems that have been used to implement the MPEG decompression operation and other digital compression and decompression operations have required expensive digital signal processors and extensive support memory. Other architectures have involved large amounts of dedicated circuitry that are not easily adapted to new digital data compression or decompression applications.

An object of the present invention is provide an improved apparatus and methods of processing MPEG, AC-3 or other streams of data.

Other objects and advantages will be apparent to those of ordinary skill in the art having reference to the following figures and specification.

SUMMARY OF THE INVENTION

In general, and in a form of the present invention, a data processing device is provided for executing a get-bit-field instruction for processing a stream of data. The device has a register file with at least four register: a first register to hold a data bit address which has a word portion and a bit portion, a second register to hold a bit field width, a third register to hold a first data word and a fourth register to hold a second data word. Addressing circuitry selects the word portion of the data bit address and accesses a memory circuit to get the first data word and transfers it to the third register. An adder circuit adds the bit width to the data bit address to form a second data bit address and the addressing circuitry accesses the second data word using the word portion of the second bit address and transfer the second data word to the fourth register. A funnel shifter is connected to the register file and simultaneously accesses the third and fourth registers in a concatenated manner. The funnel shifter selects a bit field from the concatenated registers according to the bit address portion of the second data bit address.

Other embodiments of the present invention will be evident from the description and drawings.

DESCRIPTION OF THE DRAWINGS

Other features and advantages of the present invention will become apparent by reference to the following detailed description when considered in conjunction with the accompanying drawings, in which.

Corresponding numerals and symbols in the different figures and tables refer to corresponding parts unless otherwise indicated.

DESCRIPTION OF THE INVENTION

Aspects of the present invention include methods and apparatus for processing and decompressing an audio data stream. In the following description, specific information is set forth to provide a thorough understanding of the present invention. Well known circuits and devices are included in block diagram form in order not to complicate the description unnecessarily. Moreover, it will be apparent to one skilled in the art that specific details of these blocks are not required in order to practice the present invention.

The present invention comprises a system that is operable to efficiently decode a stream of data that has been encoded and compressed using any of a number of encoding standards, such as those defined by the Moving Pictures Expert Group (MPEG-1 or MPEG-2), or the Digital Audio Compression Standard (AC-3), for example. In order to accomplish the real time processing of the data stream, the system of the present invention must be able to receive a bit stream that can be transmitted at variable bit rates up to 15 megabits per second and to identify and retrieve a particular audio data set that is time multiplexed with other data within the bit stream. The system must then decode the retrieved data and present conventional pulse code modulated (PCM) data to a digital to analog converter which will, in turn, produce conventional analog audio signals with fidelity comparable to other digital audio technologies. The system of the present invention must also monitor synchronization within the bit stream and synchronization between the decoded audio data and other data streams, for example, digitally encoded video images associated with the audio which must be presented simultaneously with decoded audio data. In addition, MPEG or AC-3 data streams can also contain ancillary data which may be used as system control information or to transmit associated data such as song titles or the like. The system of the present invention must recognize ancillary data and alert other systems to its presence.

Figure 1:
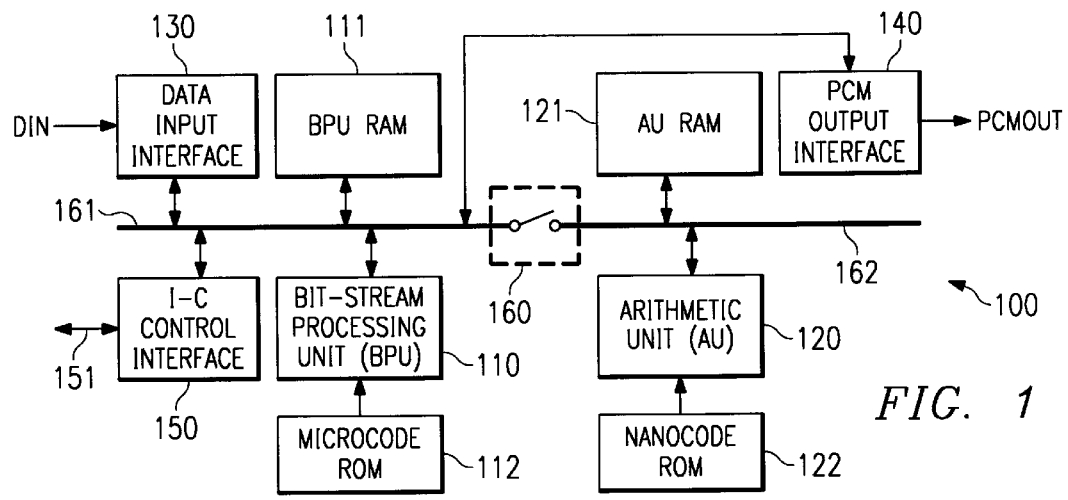
FIG. 1 is a block diagram of a data processing device constructed in accordance with aspects of the present invention.

In order to appreciate the significance of aspects of the present invention, the architecture and general operation of a data processing device which meets the requirements of the preceding paragraph will now be described. Referring to FIG. 1, which is a block diagram of a data processing device 100 constructed in accordance with aspects of the present invention, the architecture of data processing device 100 is illustrated. The architectural hardware and software implementation reflect the two very different kinds of tasks to be performed by device 100: decoding and synthesis. In order to decode a steam of data, device 100 must unpack variable length encoded pieces of information from the stream of data. Additional decoding produces set of frequency coefficients. The second task is a synthesis filter bank that converts the frequency domain coefficients to PCM data. In addition, device 100 also needs to support dynamic range compression, downmixing, error detection and concealment, time synchronization, and other system resource allocation and management functions.

The design of device 100 includes two autonomous processing units working together through shared memory supported by multiple I/O modules. The operation of each unit is data-driven. The synchronization is carried out by the Bit-stream Processing Unit (BPU) which acts as the master processor. Bit-stream Processing Unit (BPU) 110 has a RAM 111 for holding data and a ROM 112 for holding instructions which are processed by BPU 110. Likewise, Arithmetic Unit (AU) 120 has a RAM 121 for holding data and a ROM 122 for holding instructions which are processed by AU 120. Data input interface 130 receives a stream of data on input lines DIN which is to be processed by device 100. PCM output interface 140 outputs a stream of PCM data on output lines PCMOUT which has been produced by device 100. Inter-Integrated Circuit ($I^2C$) Interface 150 provides a mechanism for passing control directives or data parameters on interface lines 151 between device 100 and other control or processing units, which are not shown, using a well known protocol. Bus switch 160 selectively connects address/data bus 161 to address/data bus 162 to allow BPU 110 to pass data to AU 120.

Figure 2:
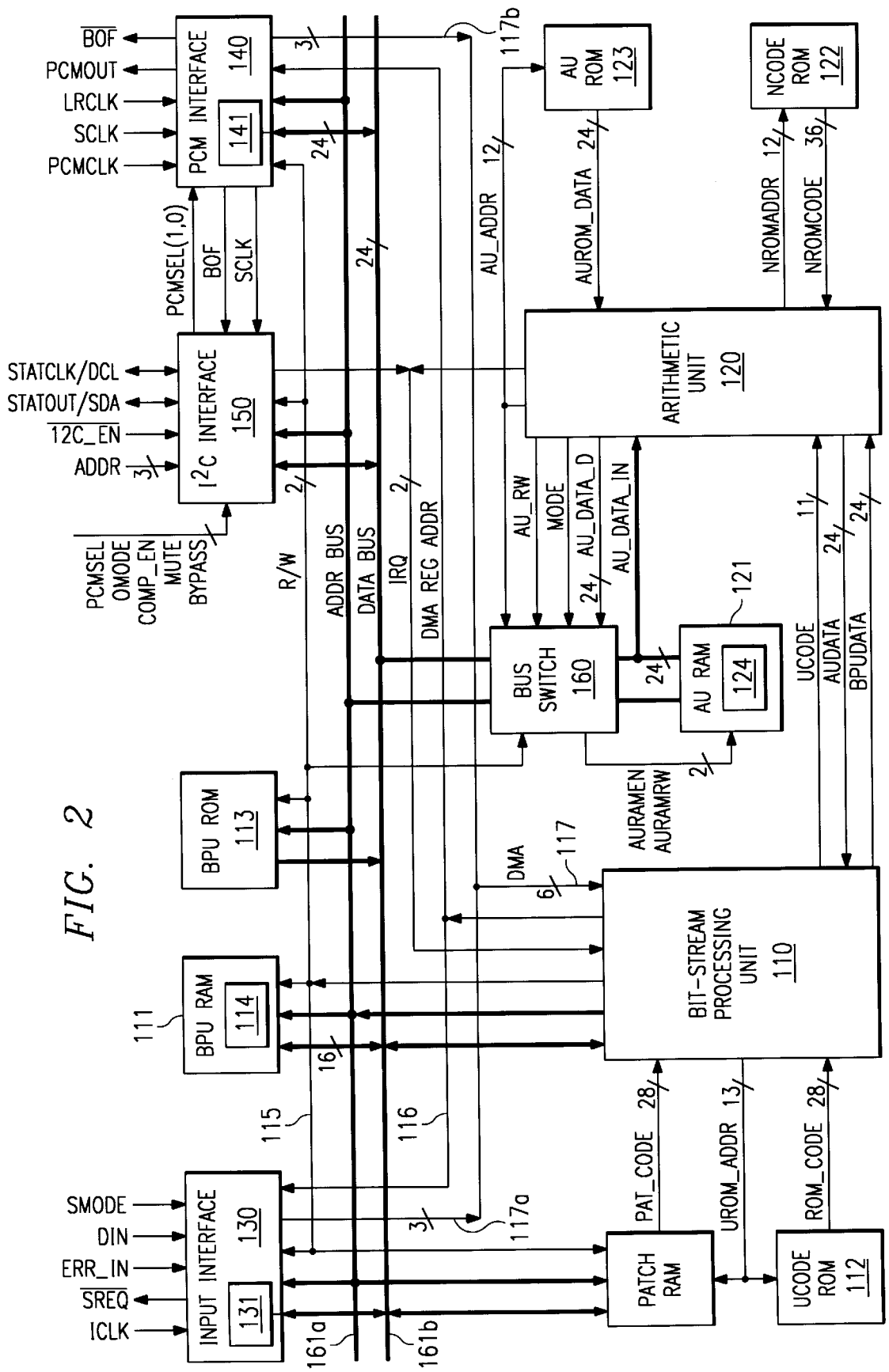
FIG. 2 is a more detailed block diagram of the data processing device of FIG. 1, illustrating interconnections of a Bit-stream Processing Unit and an Arithmetic Unit.

FIG. 2 is a more detailed block diagram of the data processing device of FIG. 1, illustrating interconnections of Bit-stream Processing Unit 110 and Arithmetic Unit 120. A BPU ROM 113 for holding data and coefficients and an AU ROM 123 for holding data and coefficients is also shown.

A typical operation cycle is as follows: Coded data arrives at the Data Input Interface 130 asynchronous to device 100's system clock, which operates at 27 MHz. Data Input Interface 130 synchronizes the incoming data to the 27 MHz device clock and transfers the data to a buffer area 114 in BPU memory 111 through a direct memory access (DMA) operation. BPU 110 reads the compressed data from buffer 114, performs various decoding operations, and writes the unpacked frequency domain coefficients to AU RAM 121, a shared memory between BPU and AU. Arithmetic Unit 120 is then activated and performs subband synthesis filtering, which produces a stream of reconstructed PCM samples which are stored in output buffer area 124 of AU RAM 121. PCM Output Interface 140 receives PCM samples from output buffer 124 through a DMA transfer and then formats and outputs them to an external D/A converter. Additional functions performed by the BPU include control and status I/O, as well as overall system resource management.

Figure 3:
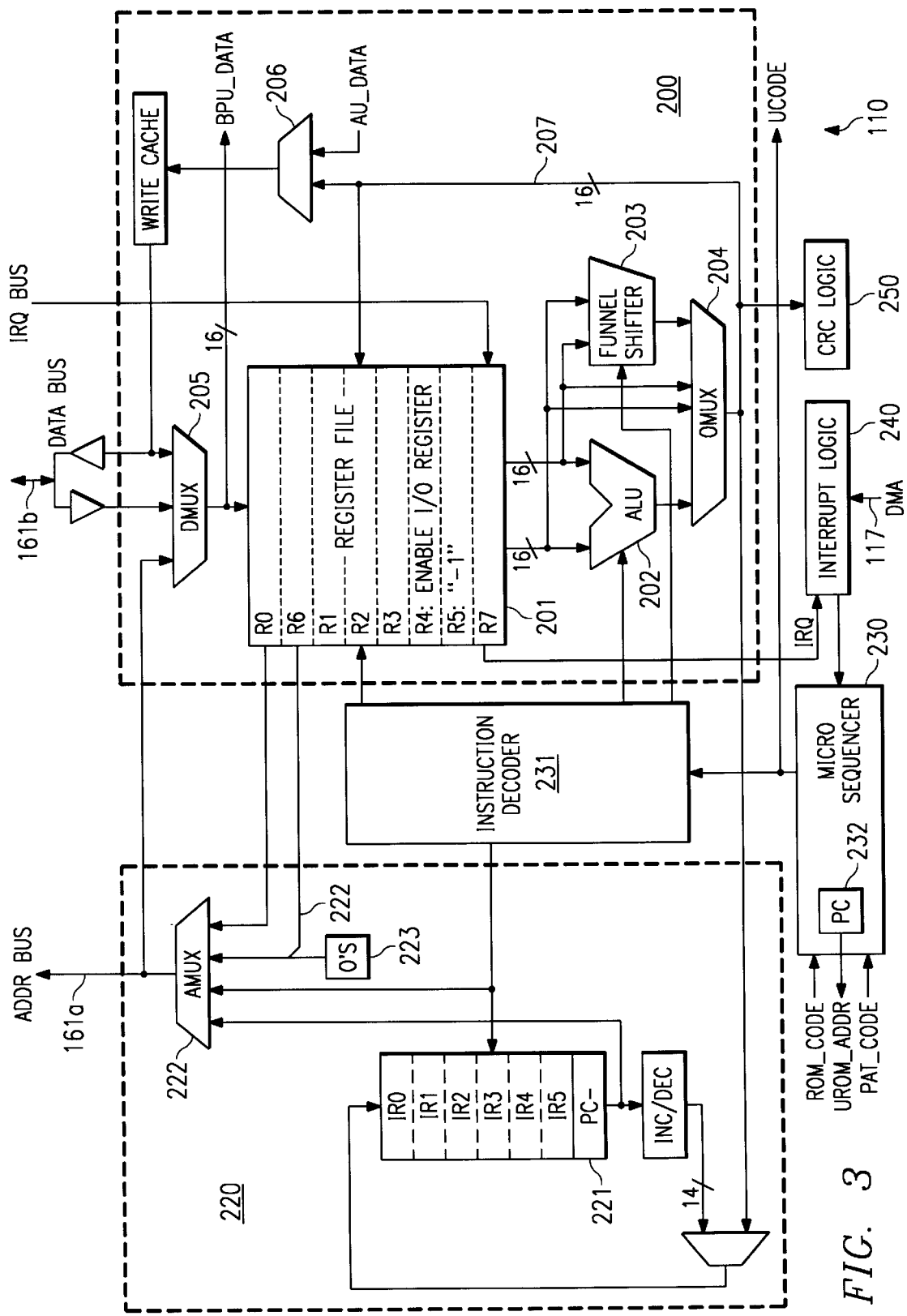
FIG. 3 is a block diagram of the Bit-stream Processing Unit of FIG. 2.

FIG. 3 is a block diagram of the Bit-stream Processing Unit of FIG. 2. BPU 110 is a programmable processor with hardware acceleration and instructions customized for audio decoding. It is a 16-bit reduced instruction set computer (RISC) processor with a register-to-register operational unit 200 and an address generation unit 220 operating in parallel. Operational unit 200 includes a register file 201 an arithmetic/logic unit 202 which operates in parallel with a funnel shifter 203 on any two registers from register file 201, and an output multiplexer 204 which provides the results of each cycle to input mux 205 which is in turn connected to register file 201 so that a result can be stored into one of the registers.

BPU 110 is capable of performing an ALU operation, a memory I/O, and a memory address update operation in one system clock cycle. Three addressing modes: direct, indirect, and registered are supported. Selective acceleration is provided for field extraction and buffer management to reduce control software overhead. Table 1 is a list of the instruction set.

TABLE 1

| BPU Instruction Set | |
|---|---|
| Instruction Mnemonics | Functional Description |
| And | Logical and |
| Or | Logical or |
| cSat | Conditional saturation |
| Ash | Arithmetic shift |
| LSh | Logical shift |
| RoRC | Rotate right with carry |

TABLE 1-continued

BPU Instruction Set

| Instruction Mnemonics | Functional Description |
| --- | --- |
| GBF | Get bit-field |
| Add | Add |
| AddC | Add with carry |
| cAdd | Conditional add |
| Xor | Logical exclusive or |
| Sub | Subtract |
| SubB | Subtract with borrow |
| SubR | Subtract reversed |
| Neg | 2's complement |
| cNeg | Conditional 2's complement |
| Bcc | Conditional branch |
| DBcc | Decrement & conditional branch |
| IOST | IO reg to memory move |
| IOLD | Memory to IO reg move |
| auOp | AU operation - loosely coupled |
| auEx | AU execution - tightly coupled |
| Sleep | Power down unit |

BPU 110 has two pipeline stages: Instruction Fetch/Predecode which is performed in Micro Sequencer 230, and Decode/Execution which is performed in conjunction with instruction decoder 231. The decoding is split and merged with the Instruction Fetch and Execution respectively. This arrangement reduces one pipeline stage and thus branching overhead. Also, the shallow pipe operation enables the processor to have a very small register file (four general purpose registers, a dedicated bit-stream address pointer, and a control/status register) since memory can be accessed with only a single cycle delay.

Figure 4:
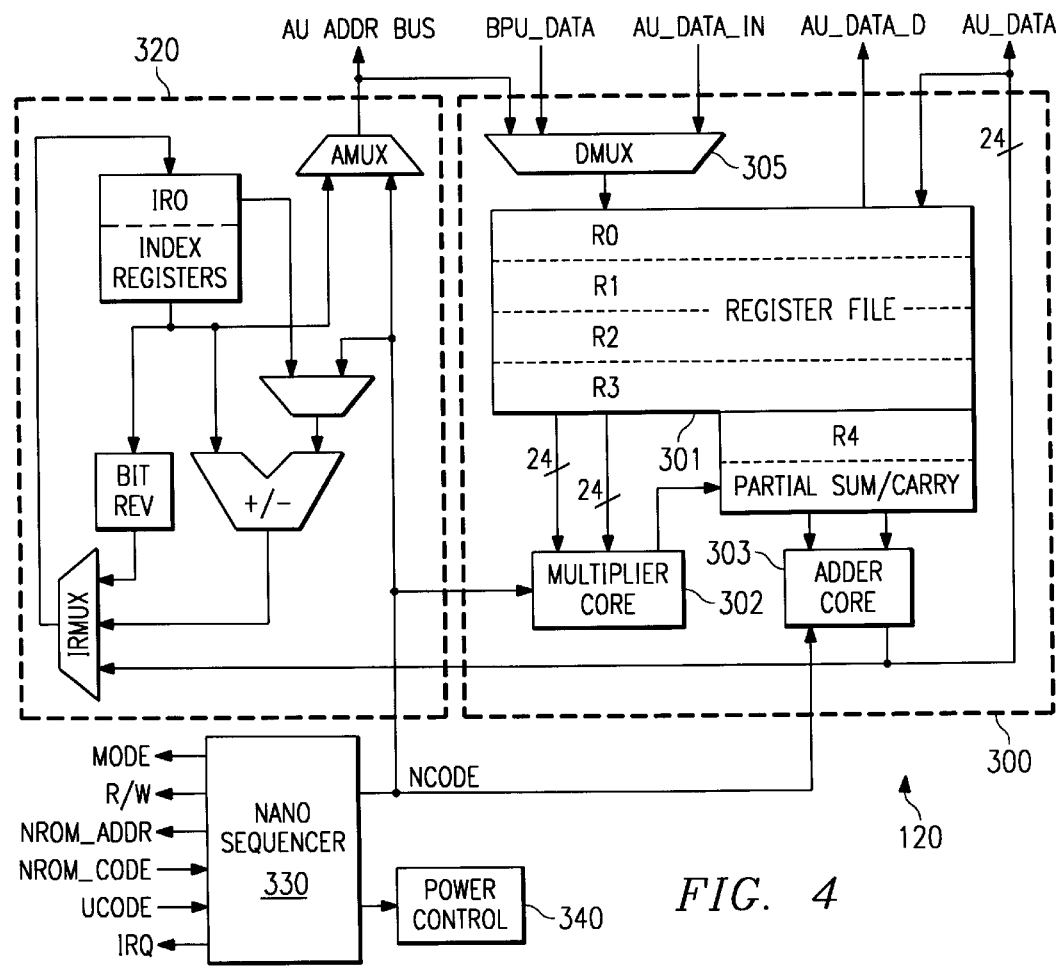
FIG. 4 is a block diagram of the Arithmetic Unit of FIG. 2.

FIG. 4 is a block diagram of the Arithmetic Unit of FIG. 2. Arithmetic unit 120 is a programmable fixed point math processor that performs the subband synthesis filtering. A complete description of subband synthesis filtering is provided in U.S. Pat. No. 5,644,310, (U.S. patent application Ser. No. 08/475,251, entitled *Integrated Audio Decoder System And Method Of Operation* or U.S. patent application Ser. No. 08/054,768 entitled *Hardware Filter Circuit And Address Circuitry For MPEG Encoded Data,* both assigned to the assignee of the present application), which is included herein by reference; in particular, FIGS. 7–9 and 11–31 and related descriptions.

The AU 120 module receives frequency domain coefficients from the BPU by means of shared AU memory 121. After the BPU has written a block of coefficients into AU memory 121, the BPU activates the AU through a coprocessor instruction, auOp. BPU 110 is then free to continue decoding the audio input data. Synchronization of the two processors is achieved through interrupts, using interrupt circuitry 240 (shown in FIG. 3).

AU 120 is a 24-bit RISC processor with a register-to-register operational unit 300 and an address generation unit 320 operating in parallel. Operational unit 300 includes a register file 301, a multiplier unit 302 which operates in conjunction with an adder 303 on any two registers from register file 301. The output of adder 303 is provided to input mux 305 which is in turn connected to register file 301 so that a result can be stored into one of the registers.

A bit-width of 24 bits in the data path in the arithmetic unit was chosen so that the resulting PCM audio will be of superior quality after processing. The width was determined by comparing the results of fixed point simulations to the results of a similar simulation using double-precision floating point arithmetic. In addition, double-precision multiplies are performed selectively in critical areas within the subband synthesis filtering process.

Figure 5:
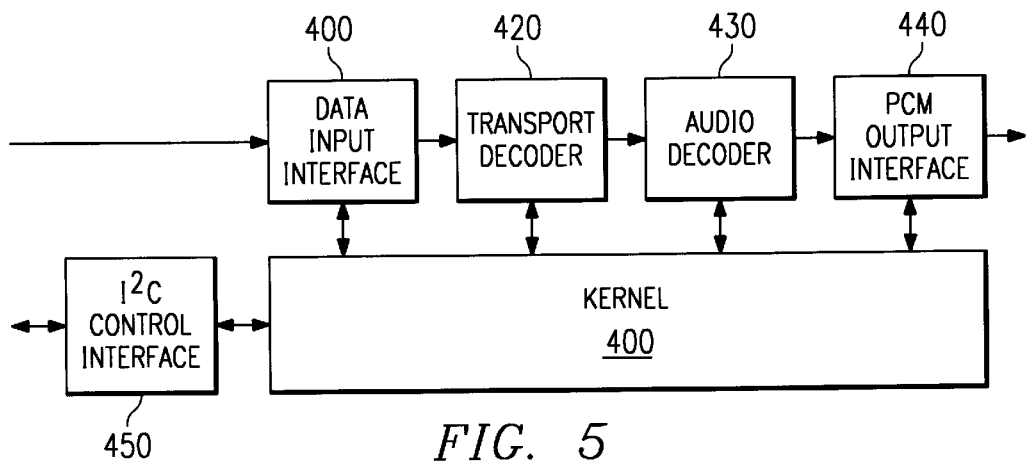
FIG. 5 is a block diagram illustrating the architecture of the software which operates on the device of FIG. 1.

FIG. 5 is a block diagram illustrating the architecture of the software which operates on data processing device 100. Each hardware component in device 100 has an associated software component, including the compressed bit-stream input, audio sample output, host command interface, and the audio algorithms themselves. These components are overseen by a kernel that provides real-time operation using interrupts and software multi-tasking.

The software architecture block diagram is illustrated in FIG. 5. Each of the blocks corresponds to one system software task. These tasks run concurrently and communicate via global memory 111. They are scheduled according to priority, data availability, and synchronized to hardware using interrupts. The concurrent data-driven model reduces RAM storage by allowing the size of a unit of data processed to be chosen independently for each task.

The software operates as follows. Data Input Interface 410 buffers input data and regulates flow between the external source and the internal decoding tasks. Transport Decoder 420 strips out packet information from the input data and emits a raw AC-3 or MPEG audio bit-stream, which is processed by Audio Decoder 430. PCM Output Interface 440 synchronizes the audio data output to a system-wide absolute time reference and, when necessary, attempts to conceal bit-stream errors. $I^2C$ Control Interface 450 accepts configuration commands from an external host and reports device status. Finally, Kernel 400 responds to hardware interrupts and schedules task execution.

Figure 6:
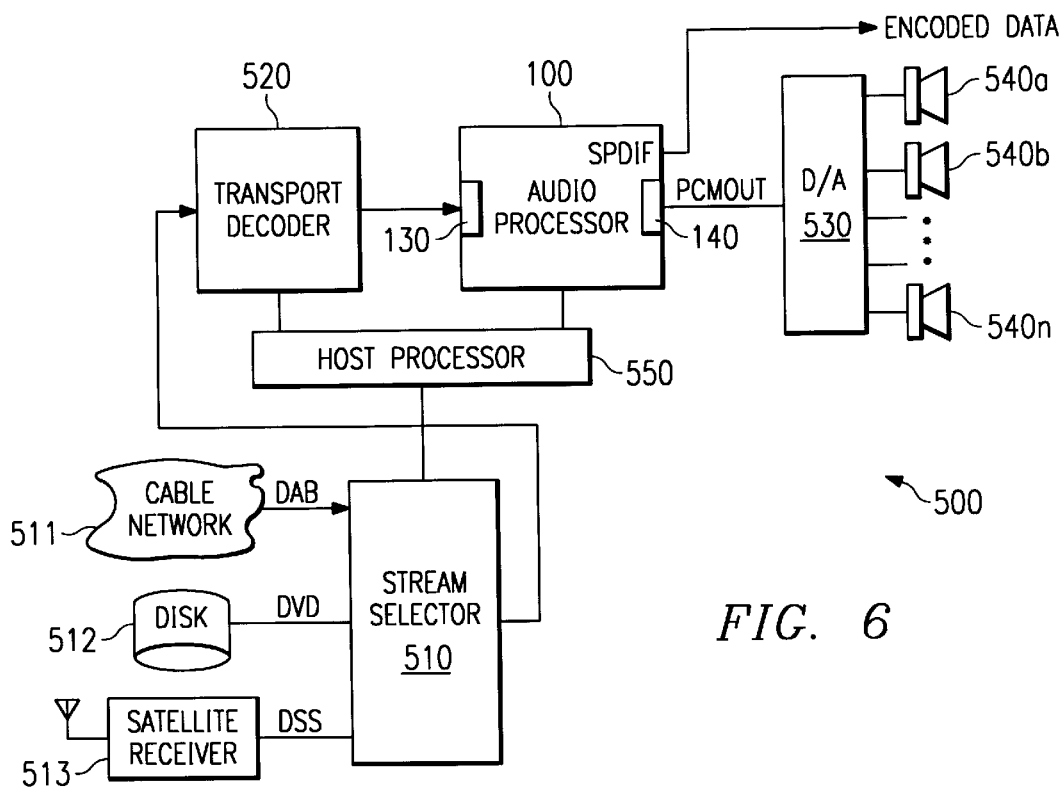
FIG. 6 is a block diagram illustrating an audio reproduction system which includes the data processing device of FIG. 1.

FIG. 6 is a block diagram illustrating an audio reproduction system 500 which includes the data processing device of FIG. 1. Stream selector 510 selects a transport data stream from one or more sources, such as a cable network system 511, digital video disk 512, or satellite receiver 513, for example. A selected stream of data is then sent to transport decoder 520 which separates a stream of audio data from the transport data stream according to the transport protocol, such as MPEG or AC-3, for that stream. Transport decoder typically recognizes a number of transport data stream formats, such as direct satellite system (DSS), digital video disk (DVD), or digital audio broadcasting (DAB), for example. The selected audio data stream is then sent to data processing device 100 via input interface 130. Device 100 unpacks, decodes, and filters the audio data stream, as discussed previously, to form a stream of PCM data which is passed via PCM output interface 140 to D/A device 530. D/A device 530 then forms at least one channel of analog data which is sent to a speaker subsystem 540a. Typically, A/D 530 forms two channels of analog data for stereo output into two speaker subsystems 540a and 540b. Processing device 100 is programmed to down-mix an MPEG-2 or AC-3 system with more than two channels, such as 5.1 channels, to form only two channels of PCM data for output to stereo speaker subsystems 540a and 540b.

Alternatively, processing device 100 can be programmed to provide up to six channels of PCM data for a 5.1 channel sound reproduction system if the selected audio data stream conforms to MPEG-2 or AC-3. In such a 5.1 channel system, D/A 530 would form six analog channels for six speaker subsystems 540a–n. Each speaker subsystem 540 contains at least one speaker and may contain an amplification circuit (not shown) and an equalization circuit (not shown).

The SPDIF (Sony/Philips Digital Interface Format) output of device 100 conforms to a subset of the Audio Engineering Society's AES3 standard for serial transmission of digital audio data. The SPDIF format is a subset of the minimum implementation of AES3. This stream of data can be provided to another system (not shown) for further processing or re-transmission.

Figure 7:
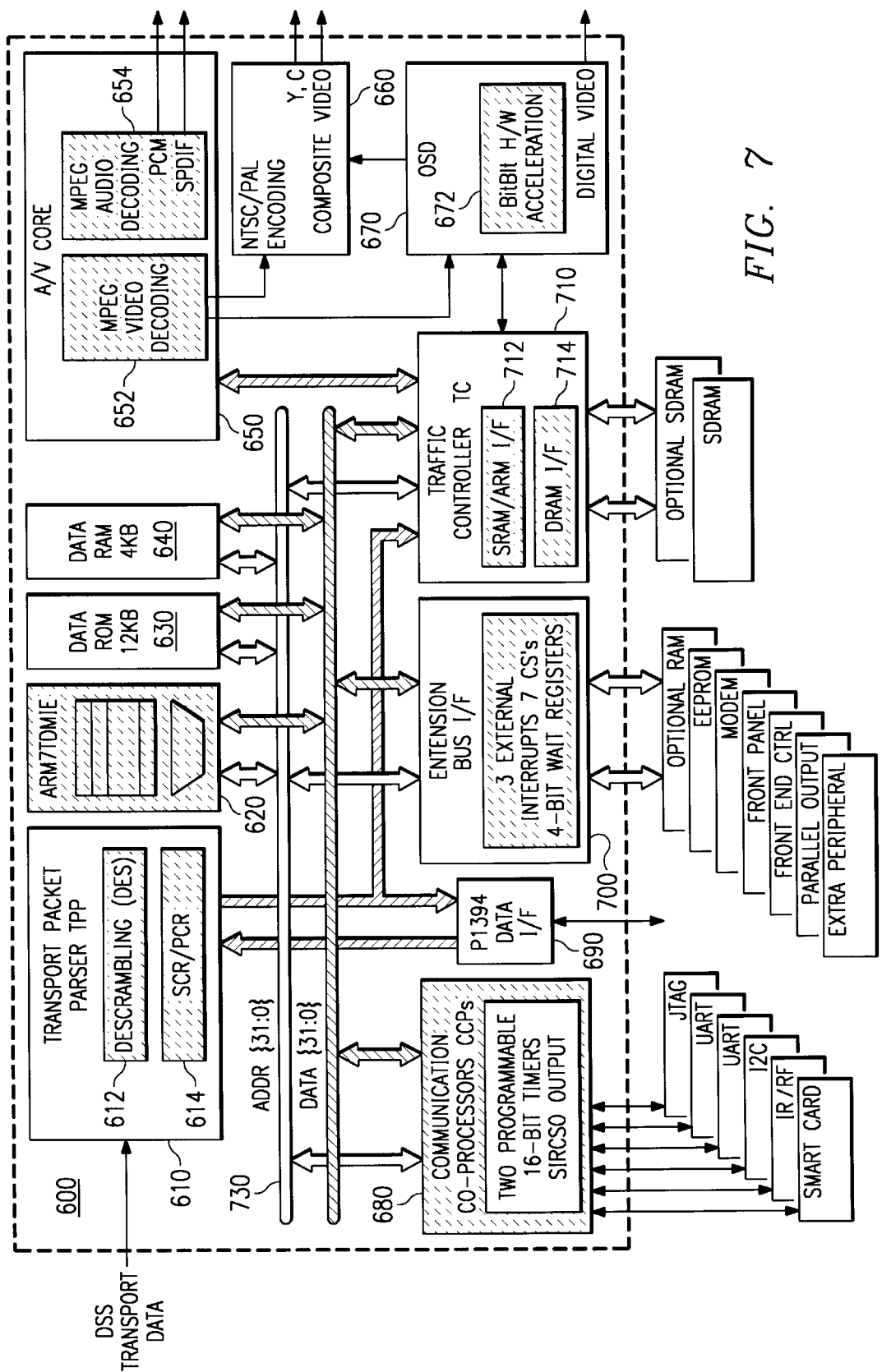
FIG. 7 is a block diagram of an integrated circuit which includes the data processing device of FIG. 1 in combination with other data processing devices, the integrated circuit being connected to various external devices.

Referring now to FIG. 7 there may be seen a functional block diagram of a circuit 300 that forms a portion of an audio-visual system which includes aspects of the present invention. More particularly, there may be seen the overall functional architecture of a circuit including on-chip interconnections that is preferably implemented on a single chip as depicted by the dashed line portion of FIG. 7. As depicted inside the dashed line portion of FIG. 7, this circuit consists of a transport packet parser (TPP) block 610 that includes a bit-stream decoder or descrambler 612 and clock recovery circuitry 614, an ARM CPU block 620, a data ROM block 630, a data RAM block 640, an audio/video (A/V) core block 650 that includes an MPEG-2 audio decoder 654 and an MPEG-2 video decoder 652, an NTSC/ PAL video encoder block 660, an on screen display (OSD) controller block 670 to mix graphics and video that includes a bit-blt hardware (H/W) accelerator 672, a communication coprocessor (CCP) block 680 that includes connections for two UART serial data interfaces, infra red (IR) and radio frequency (RF) inputs, SIRCS input and output, an I²C port and a Smart Card interface, a P1394 interface (I/F) block 690 for connection to an external 1394 device, an extension bus interface (I/F) block 700 to connect peripherals such as additional RS232 ports, display and control panels, external ROM, DRAM, or EEPROM memory, a modem and an extra peripheral, and a traffic controller (TC) block 710 that includes an SRAM/ARM interface (I/F) 712 and a DRAM I/F 714. There may also be seen an internal 32 bit address bus 320 that interconnects the blocks and seen an internal 32 bit data bus 730 that interconnects the blocks. External program and data memory expansion allows the circuit to support a wide range of audio/video systems, especially, as for example, but not limited to set-top boxes, from low end to high end.

The consolidation of all these functions onto a single chip with a large number of communications ports allows for removal of excess circuitry and/or logic needed for control and/or communications when these functions are distributed among several chips and allows for simplification of the circuitry remaining after consolidation onto a single chip. Thus, audio decoder 354 is the same as data processing device 100 with suitable modifications of interfaces 130, 140, 150 and 170. This results in a simpler and cost-reduced single chip implementation of the functionality currently available only by combining many different chips and/or by using special chipsets.

A novel aspect of data processing device 100 is that a get bit-field (GBF) instruction is provided which extracts a bit field of a specified width from the contents of two registers so that a bit field which lies across word boundaries can be easily extracted for processing by device 100. A GBF instruction which is executed in BPU 110 has the following format:

Macro
GBF (Rs, Rd)
GBFM (Rs, Rd, mem)
Operation
result=(Rd.Rs)<<(4 lsbs of R6)
field size =5 lsbs of R0

Figure 8:
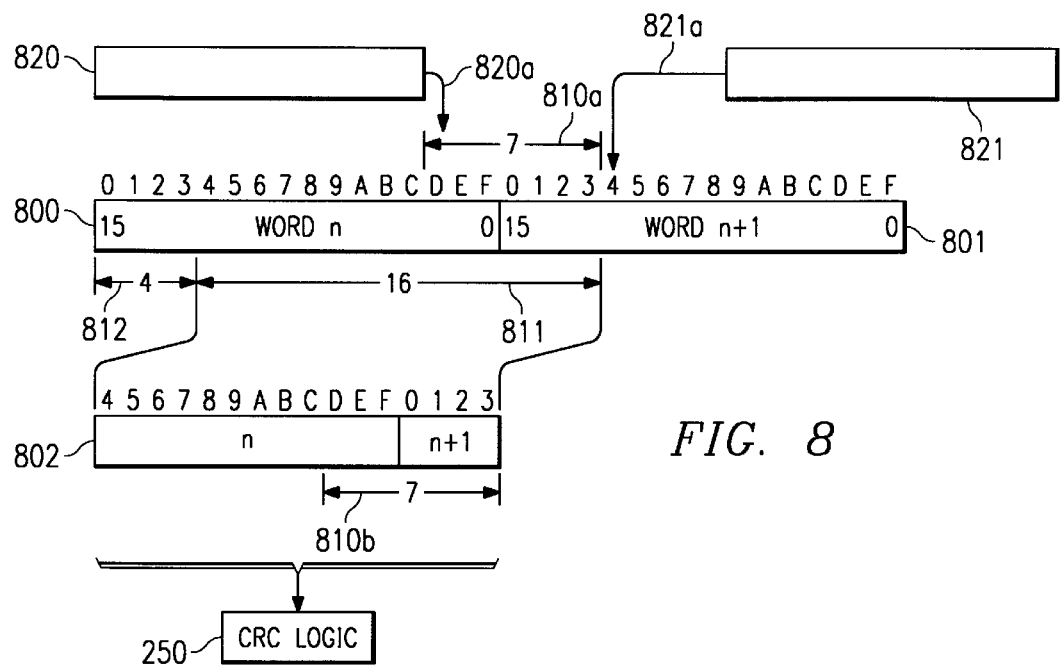
FIG. 8 is an illustration of a bit-field selection that results from executing a get bit-field instruction.

FIG. 8 is an illustration of a bit-field selection that results from executing a GBF instruction. This instruction is used to unpack a bit field from the bit-stream input buffer 114 and to include the field in cyclic redundancy check (CRC) calculation. There are two implied operands: the buffer read bit-pointer in register R6 which holds a bit address and the field size in register R0.

A bit address convention used by BPU 110 is that a bit address of "0" points to the msb of a register, even though the msb register bit is bit 15. As a serial data stream is received by interface unit 130, a first bit received is considered bit 0 and is stored in the msb position of a first word which is transferred to input buffer 114. The notation (Rd.Rs) represents the 32 bit concatenation of Rd and Rs. Rd contains an earlier word from the input stream, and Rs contains a consecutive word. This is illustrated by storage locations 800:801. The GBF instruction extracts 16 bits from one of 16 positions within this concatenated data word pair, based on the least significant 4 bits of the read pointer in R6. The result is stored in Rd or in a memory location; however, in other embodiments the result could be stored in a third register.

Still referring to FIG. 8, the field size in R0 must be between 0 and 16. The extracted field is aligned in the least significant bits of the result. This is accomplished by first adding the bit width to the bit address to form an updated bit address which points to the first bit after the selected bit field. For example, in FIG. 8, a first bit address 820 is a bit address of "n.D" (hex), where "n" is a word address portion and "D" is a bit address portion. Thus, bit address 820 points to the "D" bit in storage location 800 which was previously loaded with a data word from word address "n", as indicated by pointer 820a. A bit field 810a with a width of seven bits is to be extracted, for example. Therefore, "7" is added to "n.D" which forms updated bit address 821 which has a value of "n+1.4" (hex), as indicated by updated pointer 821a. Now, according to an aspect of the present invention, a sixteen bit field 811 is extracted from storage locations 800:801 starting with a four bit offset 812 and is shifted four bits (four being the updated bit address portion) and then loaded into storage location 802. Advantageously, the selected seven bit field 810b is right justified in storage location 802. The upper bits of the result in location 802 are "don't care" as far as selected bit field 810b is concerned and can be masked out by a subsequent instruction if needed.

The GBF instruction also triggers a CRC calculation using CRC logic 250. The extracted field is copied to a hidden 16 bit register within CRC logic 250 where it is used to feed a CRC circuit. The five lsbs of R0 are copied to a hidden 5 bit register within CRC logic 250 to indicate the field size to the CRC circuit. If the field size in R0 is 0, then the extracted field is not included in the CRC calculation.

Following the GBF instruction, the CRC logic operates at a rate of one bit per cycle. To avoid corrupting the CRC, a GBF instruction should not be performed until the CRC calculation from the previous GBF has completed. If this delay cannot be determined then the maximum delay of 16 cycles must be ensured. This point should be given special attention in an interrupt handler that uses GBF. However, it should be understood that other embodiments could provide an alternate form of CRC logic which does not have this restriction. Furthermore, novel aspects of the GBF instruction are advantageous even if a CRC logic block is not included in another embodiment.

Figure 9:
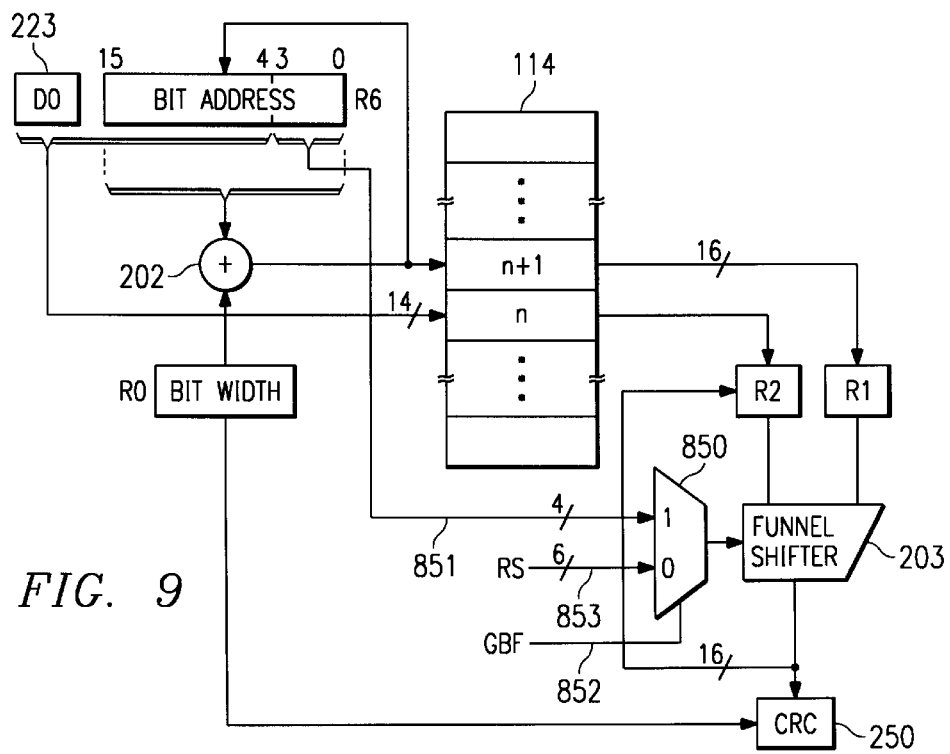
FIG. 9 is an illustration of the operation of a get bit-field macro which utilizes a get bit-field instruction, according to an aspect of the present invention.

This instruction is implemented using a 32–>16 bit funnel shifter 203 in BPU 110, shown in FIG. 3 and in FIG. 9.

FIG. 9 is an illustration of the operation of a get bit-field macro which utilizes a GBF instruction, according to an aspect of the present invention. Prior to executing the GBF macro, register R6 is initialized with a bit address of a target bit field. Since input buffer 114 is sixteen bits wide, the four lsbs of R6 form a bit address portion and the remaining msbs form a word address portion. R0 is initialized with a bit width of the target bit field. A novel aspect of register R6 is that it is connected to address multiplexor 222 (FIG. 3) in such a manner that only the 12 bit word address portion or register R6 is used to form an address for accessing input buffer 114. Padding circuitry 223 is also connected to address multiplexor 222 so that two "0"s are concatenated to the word address portion of R6 in order to form a fourteen bit address for addressing memory 111. Obviously, for other size memories, more or less padding may be required. Likewise, if register R6 or buffer 114 is a different width in another embodiment, padding should be adjusted accordingly. Furthermore, other known or novel forms of addressing mapping could be employed to expand the word address portion of R6 for accessing a large memory.

The macro executes the following instructions on BPU 110, as illustrated in FIG. 9:

1. Ld *R6, R1; loads register R1 with data from the padded first word address in R6 which points to input buffer 114 at address n.

2. Add R0, R6; adds the bit width in R0 to the bit address in R6 using adder 202 to form a second bit address.

3. Ld *R6, R2; loads register R2 with data from the updated padded address in R6 which points to input buffer 114 at address n or n+1, depending on the bit width and the bit address values.

4. GBF R1, R2; extracts a bit field from registers R2:R1 using funnel shifter 203 based on the bit address portion of R6 and stores the result back in R2 and performs a CRC update using the bit width in R0.

5. And R3, R2; ANDs the sixteen bit field extracted from R2:R1 with a mask in R3 in order to eliminate "don't care" bits outside of the selected bit field width.

Referring again to FIG. 9, a bit address portion of a bit address stored in register R6 is placed on control signals 851 and used to control funnel shifter 203. A multiplexor 850 is controlled by a select signal 852 to enable signals 851 to control funnel shifter 203 when a GBF instruction is being executed, or to enable signals 853 to control funnel shifter 203 when other instructions, such as "shift" are being executed.

Figure 10:
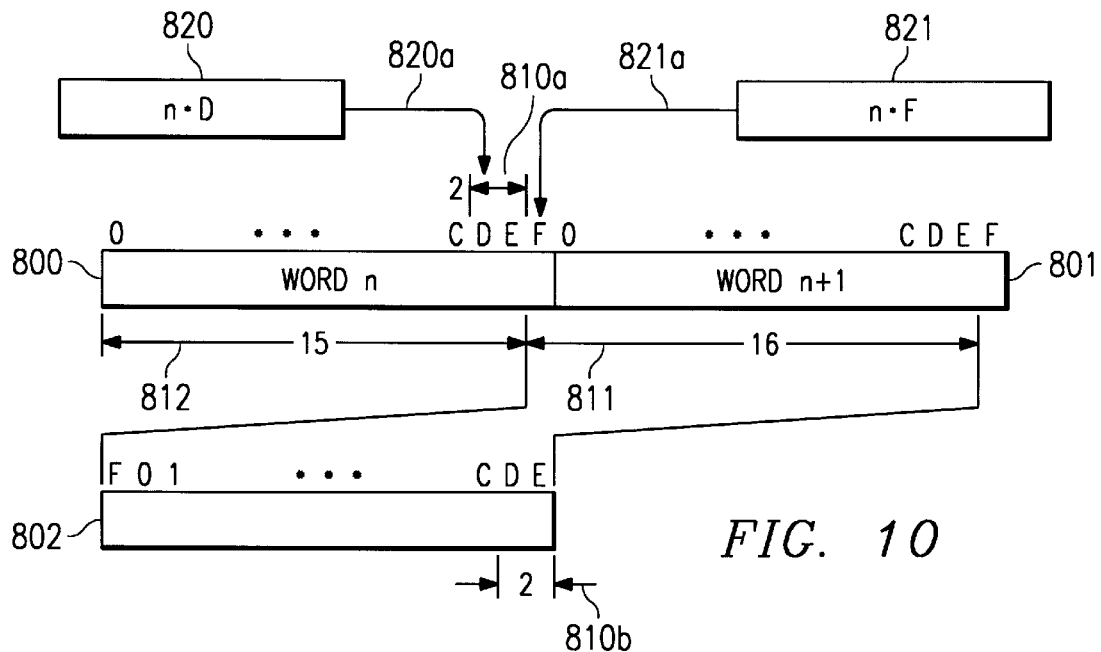
FIG. 10 is an illustration of a bit-field selection that results from executing a get bit-field instruction macro of FIG. 9, when a same address is accessed twice.

FIG. 10 illustrates a case in which the same data address is accessed twice. Note that in instruction 2 above, Add, the updated bit address may have the same word address portion as the first bit address. In this case the same address in buffer 114 will be accessed twice and R2 and R1 will have the same data. Advantageously, regardless of the bit width value, a correct bit field will be extracted. In this example, word address 820 is n.D and bit width 810a is 2. Therefore, updated bit address 821 is n.F. Since updated bit address 821 still has a word address portion which is "n," a data word from word address "n" will be stored in both storage locations 800 and 801. According to an aspect of the present invention, a correct bit field 810b will be extracted and right aligned in storage location 802 by using a fifteen bit offset 812 and shifting fifteen bits (fifteen being the updated bit address. portion "F") and then loading the extracted sixteen bit field 811 into storage location 802. As discussed with reference to FIG. 8, the most significant 14 bits of the result in location 802 are "don't care" as far as selected 2-bit field 810b is concerned and can be masked out by a subsequent instruction if needed.

The five instruction sequence described above is illustrates only one of many possible ways to practice aspects of the present invention. In BPU 110, each instruction executes in a single cycle. Other embodiments may use different instructions, more complex instructions, microcode sequences or hardware circuits, for example, to provide advantages of the present invention.

Figure 11:
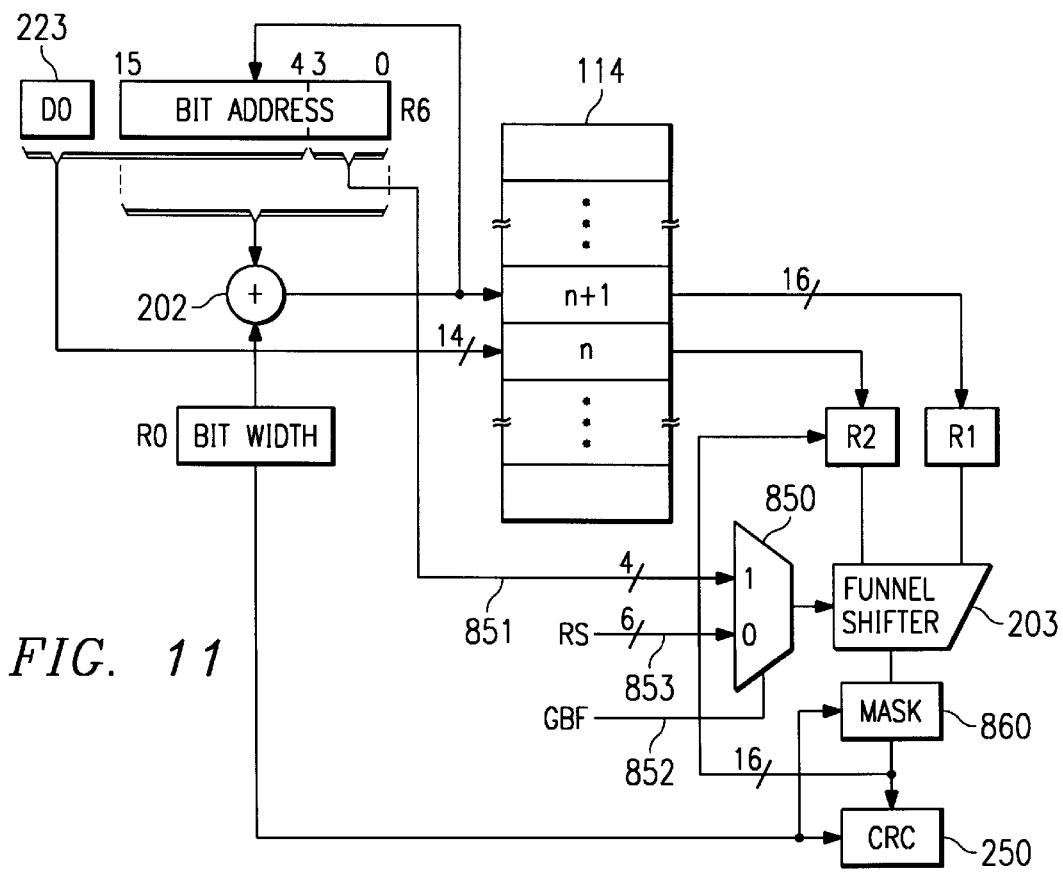
FIG. 11 is an illustration of an alternate embodiment of the processor of FIG. 3.

FIG. 11 is an illustration of an alternate embodiment of BPU 110 which includes masking circuitry 860 connected to funnel shifter 203 and to register R0 which contains the bits width value. Masking circuitry 860 develops a mask based on the value of the bit width and masks out msbs of the extracted sixteen bit field which are not within the bit field specified by the bit width. The masked msb bits are set to a selected value, such as "0."

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual devices which may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

An advantage of the present invention is that a simple funnel shifter can be utilized to extract a bit field of any selected width from a plurality of data words and align the extracted bit field in a storage location using a simple control mechanism.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A data processing device for executing a get-bit-field instruction for processing a stream of data, comprising:

a register file having a plurality of general purpose registers, with a first register operable to hold a first data bit address comprising a word address portion and a bit position portion, a second register operable to hold a bit field width, a third register operable to hold a first data word, and a fourth register operable to hold a second data word;

memory circuitry operable to hold a portion of the stream of data, addressing circuitry for addressing the memory circuitry, the address circuitry operable to use the word address portion of the first register to form a first address of the first data word and a second address of the second data word, such that the first address and the second address may by the same;

adder circuitry connected to the register file, the adder circuitry operable to add the bit field width to the first data bit address to form a second data bit address and to replace the first data bit address in the first register with the second data bit address; and a funnel shifter connected to the register file such that the third register and the fourth register can be simultaneously accessed, the funnel shifter operable to extract a bit field having a plurality of bits for processing from the first data word and the second data word responsive to the bit position portion of the first register.

2. The data processing device of claim 1, wherein the adder circuitry further comprises padding circuitry operable to form a set of most significant address bits having a preselected value concatenated to the word address portion of the first register.

3. The data processing device of claim 2, wherein the preselected value of the set of most significant address bits is a set of zeros.

4. The data processing device of claim 3, further comprising CRC circuitry connected to the funnel shifter, the CRC circuitry operable to receive the bit field extracted by the funnel shifter and to include the extracted bit field in a CRC calculation responsive to executing the get-bit-field instruction.

5. The data processing device of claim 4, wherein the CRC circuitry is further connected to the second register, the CRC circuitry operable to receive the bit width from the second register and to use the bit width to select a portion of the extracted bit field to be included in the CRC calculation.

6. The data processing device of claim 1, further comprising masking circuitry connected to the funnel shifter and to the second register, the masking circuitry operable to set a portion of the extracted bit field to a selected value in response to the bit width.

7. A method for extracting a bit field from a stream of data in a device for processing a stream of data, wherein the device has a register file, the method comprising the steps of:

storing a least a portion of the data stream in a memory circuitry of the device in a sequential data word manner;

storing a first data bit address in a first register of the register file, the first data bit address having a first word address portion and a first bit position portion;

storing a bit field width in a second register of the register file;

transferring a first data word from the memory circuitry to a third register of the register file responsive to the first word address portion;

adding the bit field width to the first data bit address to form a second data bit address, the second data bit address having a second word address portion and a second bit position portion;

transferring a second data word from the memory circuitry to a fourth register of the register file responsive to the second word address portion; and extracting a concatenated bit field from the third register and the fourth register responsive to the second bit position portion.

8. The method of claim 7, further comprising padding the first word address portion with a preselected set of most significant bits to form a first data word address.

9. The method of claim 8, wherein the second word address portion has the same value as the first word address portion and the second data word is thereby identical to the first data word.

10. The method of claim 9, further comprising masking the extracted bit field such that a set of bits corresponding to the bit field width are selected and all other bits in the extracted bit field are replaced with a preselected value.

11. A method for executing a single get-bit-field instruction which extracts a bit field from a stream of data within a data processing device, wherein the device has a register file, the method comprising the steps of:

I. initializing the register file prior to executing the instruction, wherein the step of initializing comprises:

storing a first data bit address in a first register of the register file, the data bit address having a first word address portion and a first bit position portion;

transferring a first data word from the data stream to a second register of the register file responsive to the first word address portion;

adding a bit field width to the first data bit address to form a second data bit address having a second word address portion and a second bit position portion such that the second word address portion may be the same as the first word address portion; and transferring a second data word from the data stream to a third register of the register file responsive to the second word address portion; and II. executing the instruction, wherein the step of executing comprises:

accessing the first register, the second register and the third register in a parallel manner; and extracting a concatenated bit field from the second register and the third register responsive to the bit position value portion of the first register responsive to the second bit position portion.

12. The method of claim 11, further comprising storing the extracted concatenated bit field in the second register.

13. An audio reproduction system, comprising:

means for acquiring a stream of data which contains encoded audio data;

a data device for processing the stream of data connected to the means for acquiring, the data device operable to form at least one channel of PCM data on an at least one device output terminal;

a digital to analog converter connected to the output terminal operable to convert the channel of PCM data to an analog audio signal on a D/A output terminal;

a speaker subsystem connected to the D/A output terminal;

wherein the data device further comprises:

a register file having a plurality of general purpose registers, with a first register operable to hold a first data bit address comprising a word address portion and a bit position portion, a second register operable to hold a bit field width, a third register operable to hold a first data word, and a fourth register operable to hold a second data word;

memory circuitry operable to hold a portion of the stream of data, addressing circuitry for addressing the memory circuitry, the address circuitry operable to use the word address portion of the first register to form a[n] first address of the first data word and a second address of the second data word, such that the first address and the second address may by the same;

adder circuitry connected to the register file, the adder circuitry operable to add the bit field width to the first data bit address to form a second data bit address and to replace the first data bit address in the first register with the second data bit address; and a funnel shifter connected to the register file such that the third register and the fourth register can be simultaneously accessed, the funnel shifter operable to extract a bit field having a plurality of bits for processing from the first data word and the second data word responsive to the bit position portion of the first register.

14. The audio reproduction system of claim 13, wherein the means for acquiring comprises a satellite broadcast receiver.

15. The audio reproduction system of claim 13, wherein the means for acquiring comprises a digital disk player.

16. The audio reproduction system of claim 13, wherein the means for acquiring comprises a cable TV receiver.

* * * * *